Feb. 8, 1938.  W. D. MORTON ET AL  2,107,954
CLUTCH AND TRANSMISSION MECHANISM
Filed April 19, 1932  3 Sheets-Sheet 1
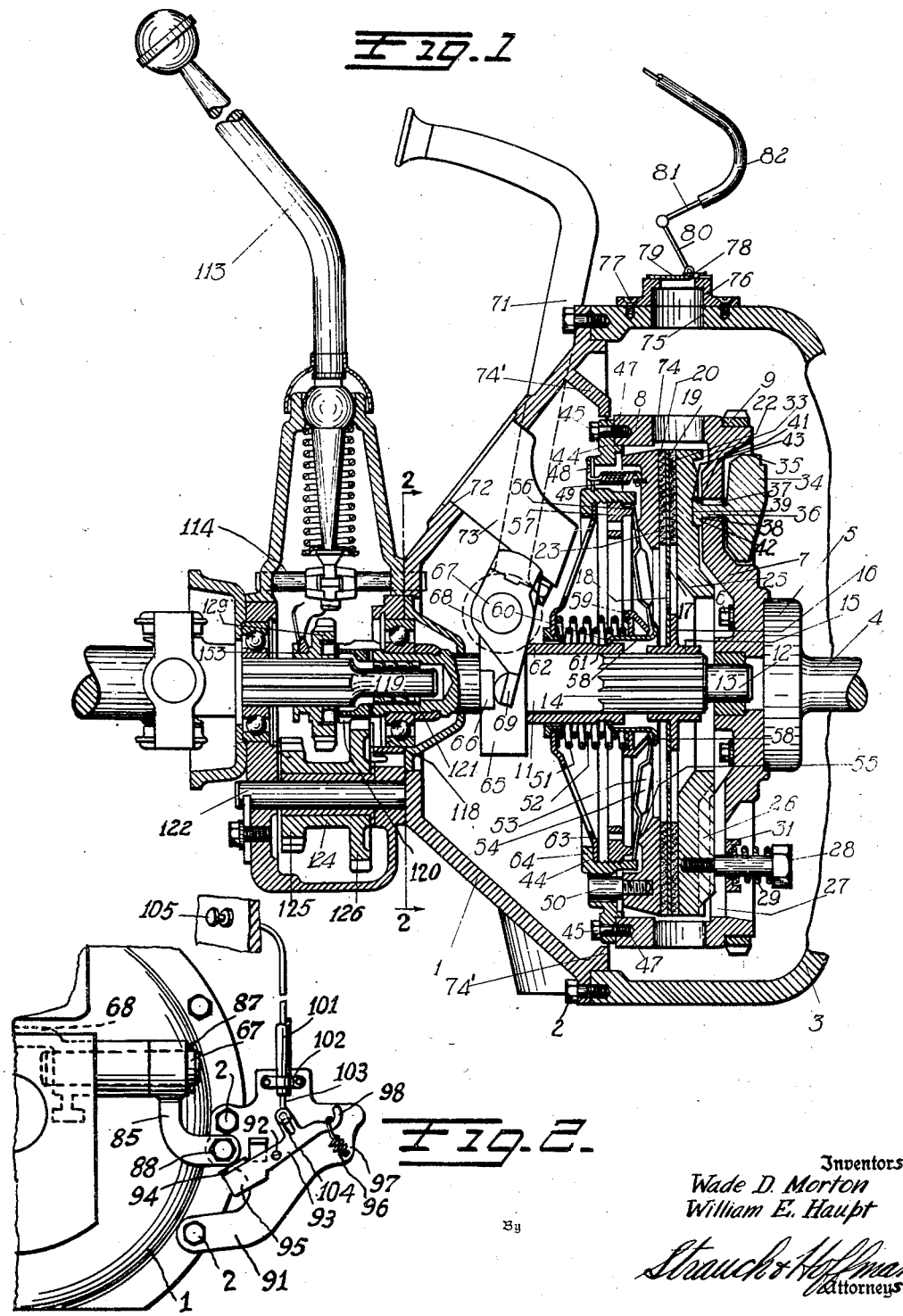
Inventors
Wade D. Morton
William E. Haupt
By Strauch & Hoffman
Attorneys

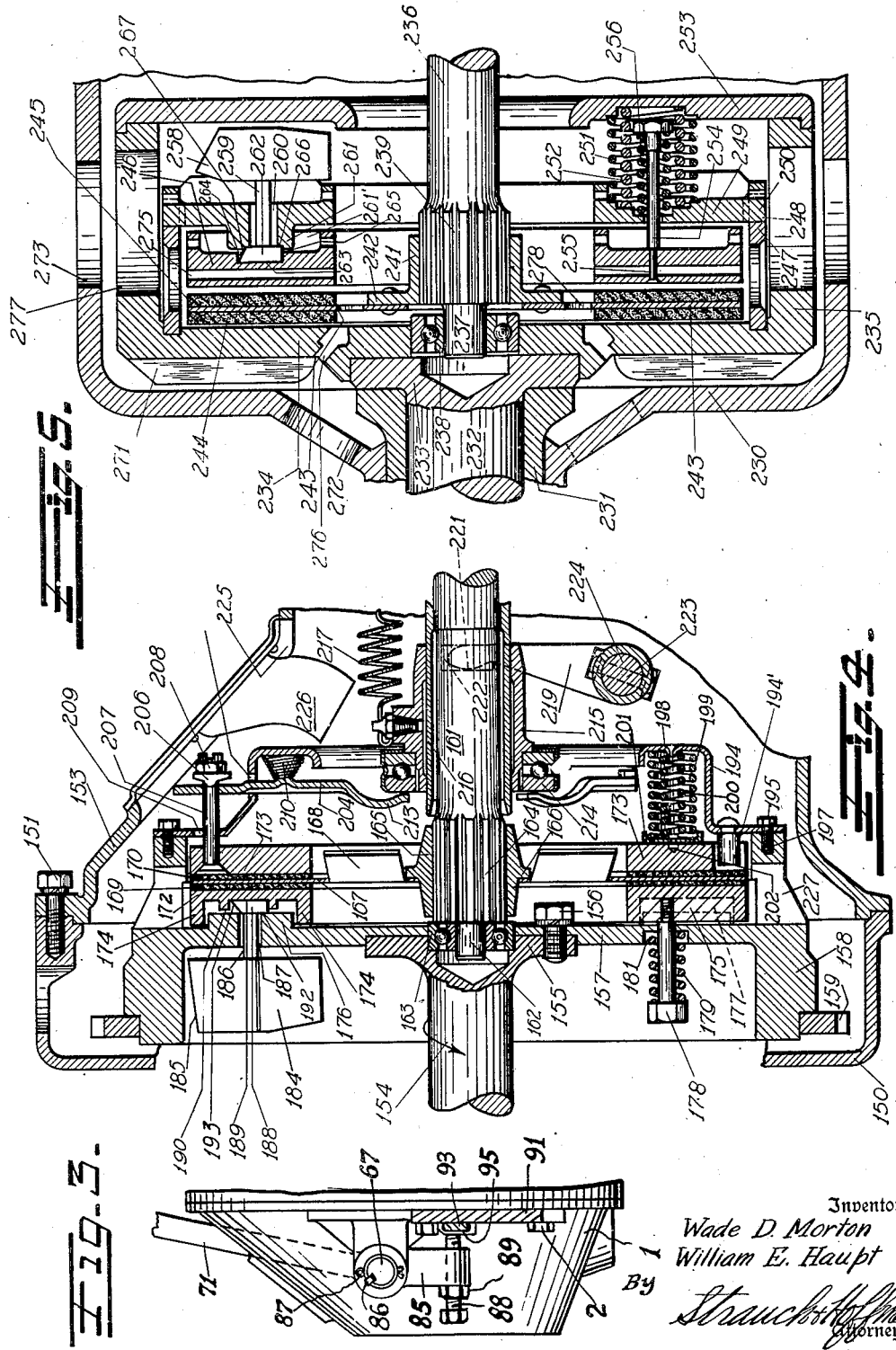

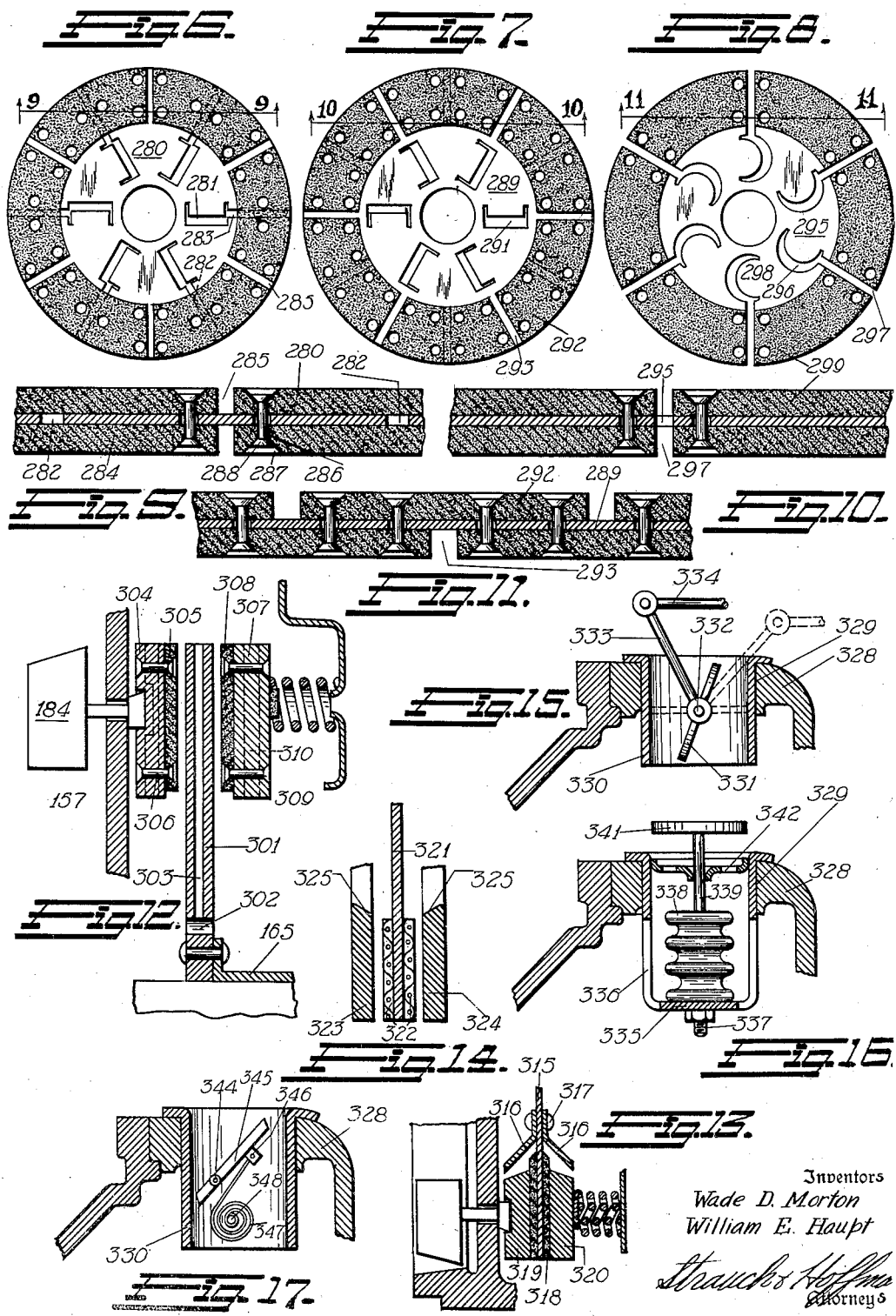

Patented Feb. 8, 1938

2,107,954

UNITED STATES PATENT OFFICE 2,107,954

CLUTCH AND TRANSMISSION MECHANISM

Wade D. Morton, Gloucester City, and William E. Haupt, Westville, N. J., assignors to Automatic Drive & Transmission Company, Gloucester City, N. J., a corporation of New Jersey Application April 19, 1932, Serial No. 606,238

18 Claims. (Cl. 192—113)

The present invention relates to improved clutch and transmission mechanisms. More particularly the present invention relates to improved clutches of the self-operating or automatic type, and novel combinations therewith of torque multiplying transmissions, particularly adapted for motor vehicle or similar drives.

The present invention comprises improvements in automatic or self-operating clutches of the type disclosed in copending applications, Serial No. 580,172, filed December 10th, 1931 which issued November 6, 1934 as United States Patent No. 1,979,880, and in Serial No. 488,757, filed October 15th, 1930, which issued June 4, 1935 as United States Patent No. 2,003,324. In copending application S. N. 580,172 which has become Patent No. 1,979,880 the centrifugal clutch operating weight levers are disposed around the periphery of the clutch driving and driven plates which requires the use of an unnecessarily large space for satisfactory transmission of given amounts of power. Unless the clutch parts are excessively large with the arrangement of said Patent No. 1,979,880, lower percentage of graphite and high coefficients of friction must be used in the clutch facings, and high engaging pressures must be applied thereto, decreasing the smoothness and increasing the temperatures of operation. As increases of temperature of the clutch material decreases the coefficient of friction of the novel material utilized, the parts must be sufficiently large to provide effective cooling in operation. In addition, due to the application of the heavy engaging pressures at the outer periphery of the clutch plates the plates must be made unnecessarily heavy to resist distortion and warping under the heavy pressures and high temperatures of operation. Accordingly to provide a satisfactory clutch within the cost, space, and weight limits demanded for the low cost modern motor vehicle clutches embodying the mechanical arrangement disclosed in said Patent No. 1,979,880 has not been found feasible.

As a result the clutch mechanism disclosed in said Patent No. 2,003,324 was developed to provide a more compact, low cost, light weight clutch arrangement utilizing the novel material of said Patent No. 1,979,880, for motor vehicle installation, and to secure efficient utilization of the space available for automotive types of clutches in existing automobiles. By providing a centrifugally operated weight arrangement in which the weight levers extend through the web of a flywheel, and the operating pressures are applied to the clutch plate approximately opposite the center of the engaging driving surfaces, considerable economy in space and reduction in necessary weight and size of the clutch plates has been effected over the clutch arrangement disclosed in said Patent No. 1,979,880. A large number of such clutches using a facing material with approximately forty percent graphite in the original mixture from which the clutch facing is formed have operated for long distances in otherwise standard Ford and other automobiles, in combination with the standard three speed gear sets or transmission.

Ventilation of the clutch mechanism of said copending applications to remove solid lubricant freed from the clutch facings and cooling is provided for solely by radiation from the clutch casing and circulation of air in the clutch casing or housing is induced by rotation of the clutch parts, leaving the dust in the casing. The engaging pressures also are comparatively heavy on the clutch plates, with the result that in operation, particularly under abuse, excessive temperatures with resultant lower coefficients and undesirable slippage and warpage of the clutch plates, and undesirable settling of dust from within the clutch casing on the surface of the facings may occur, giving undesirable variability and lack of uniformity of operation, which while not sufficient to prevent practical operation, reduces the wearing and desirable operating characteristics of the clutch mechanism as compared to the improved action secured in clutch mechanisms embodying the present invention. In practice it has also been found that the usual grades of steel used in clutch plates are not satisfactory for use in automatic clutches. Efforts to use steel, cast iron and gunite plates in clutches of the type illustrated in said Patent No. 2,003,324 were made, but it was found in practice under abuse that such plates will warp and will materially reduce the life and effectiveness of the clutch.

By providing proper materials and proper construction of the clutch plates and a forced draft for cooling and ventilation, together with temperature control of the mechanism, I have been enabled to provide a compact, thoroughly ventilated and highly efficient clutch mechanism utilizing the improved clutch facings of Patent No. 1,979,880 and embodying forty percent to sixty percent of graphite in which regardless of usage to which the clutches are subjected warpage is for all practical purposes eliminated, and in which the clutch action is improved to such an extent that for vehicle of the pleasure car class and broader commercial types of vehicles, a transmission mechanism embodying a single forward gear reduction may be utilized in combination with my improved clutch with entire satisfaction, giving a clutch life equal or greater than that secured with existing conventional three and four speed transmissions. This is made possible due to the fact that with the improved clutch mechanism of the present invention, a multiplying gear ratio is needed for driving purposes in the motor vehicle only when the torque demands are higher than the maximum torque deliverable by the motor, as for example in starting the vehicle on a substantial grade or in pulling from a bad hole. For normal driving purposes, the vehicle may be started with the transmission in high gear because of the special characteristics of the clutch facings and plate constructions, the controlled temperatures and regulated slippage developed, and the smooth uniform application of power by my improved clutch mechanism, which permits the slippage necessary to pick up the load, but prevents slippage when the load is being driven at an operating speed predetermined by the clutch design.

Accordingly a primary object of the present invention is to provide improved compact efficient automatic or self-operating constructions specially adapted for automotive drive purposes but applicable to a wide variety of industrial power drives.

Another object of the present invention is to provide novel compact, ventilated automatic or self operating clutches that may be manufactured at low cost by quantity production methods and will function satisfactorily within the weight and space limits of automotive vehicles to pick up the load with a slipping drive in normal operation in high gear, and while the load is being driven at normal speeds eliminates slippage of the clutch parts whereby a highly efficient low cost drive for vehicles may be provided.

A further object of the present invention is the provision of improved self operating clutch and torque multiplying transmission combinations of compact, low cost construction adapted to meet the space, weight, and low cost requirements necessary to permit adoption thereof in modern motor vehicle of the low priced pleasure car class.

Still further objects of the present invention will appear from the following detailed disclosure of preferred embodiments thereof and are defined by the terms of the appended claims.

In the drawings:

Figure 1 is a longitudinal sectional view of an automatic clutch forming part of the present invention associated with a two speed transmission, i. e., (one direct—one reduced).

Figure 2 is a fragmental rear view of the clutch housing shown in Figure 1 as it appears when the transmission has been removed therefrom.

Figure 3 is a fragmental view in elevation of the device shown in Figure 2.

Figure 4 is a longitudinal sectional view of a modified form of automatic clutch.

Figure 5 is a longitudinal sectional view of a further modified form of automatic clutch, which is especially adapted for industrial drives.

Figures 6, 7, and 8 are views in elevation of modified driven plates that are adapted to be used in connection with the various automatic clutches shown.

Figures 9, 10 and 11 are enlarged sectional views taken on the lines 9—9, 10—10, 11—11, of Figures 6, 7 and 8 respectively, when viewed in the direction of the arrows.

Figures 12, 13 and 14 are sectional views of further modified driven plates and that are adapted to be incorporated in any of the clutches previously shown, and disclose special means for deflecting the air stream to effect proper cooling of the clutch elements.

Figures 15, 16 and 17 are detailed sectional views of the clutch housings of Figures 1, 4 and 5 associated with various means for controlling the exhaust of air therefrom.

With continued reference to the drawings, wherein like reference characters refer to like parts throughout the several figures thereof, a housing member 3, suitably connected to an engine or other prime mover, is secured by means of bolts 2 to a housing 1. Engine or driving shaft 4 extends into the housing 3 and is provided on the end thereof with a flange 5. Secured to the flange 5, in any suitable manner, as by bolts 6, is the web portion 7 of a flywheel 8. Flywheel 8 is provided on its periphery with the usual starting gear 9.

Disposed in axial alignment with the shaft 4, and mounted for rotation, is driven shaft 11, which is reduced at 12 at one end and journaled in a suitable anti-friction bearing 13 secured in the flywheel web, and is adapted to have the other end thereof operably connected to a suitable gear changing apparatus for amplifying the torque applied to the final driven member which will be described hereinafter. Driven shaft 11 has a splined portion 14 on which a correspondingly splined hub 15 is slidably mounted. Hub 15 is provided with a flange 16 to which is suitably secured in any suitable manner, as by welding, riveting or the like, a relatively thin metal disk 17, which constitutes the driven clutch disk or member. Disk 17 has apertures 18 struck out of the body thereof adjacent its junction with the flange 16. Each face of disk 17, near the periphery thereof is provided with a facing 19 and 20, respectively, which may consist of any material that has the required characteristics to give the correct frictional gripping force, and at the same time has wearing qualities adapting it for this purpose. We prefer, however, to use the lubricated type of material disclosed in the application of Charles B. Heinrich, Serial No. 580,172, filed December 10th, 1931, now issued as Patent No. 1,979,880, dated November 6, 1934 embodying large percentages of graphite, which in practice have given very satisfactory results in a clutch of this character.

Frictional facing 19 and 20 may be secured to the disk 17 in any suitable manner, as for instance by means of rivets or the like. Each of the facings 19 and 20, cooperates with a suitable annular plate for effecting a driving connection between the driving shaft 4 and the driven shaft 11. Plate 22 engaging the facing 19, we term the automatic plate, and plate 23 engaging the facing 20 is termed the positive plate.

The construction of the automatic plate 22 and its actuating mechanism will now be described. Plate 22 has a strengthening rib 25 formed on the face thereof in the region of the central hole therethrough. This web gives the plate rigidity, and prevents distortion or warpage thereof. Integral radial keys 26 are formed on one face of the plate. The number of keys employed in a particular installation is determined by a consideration of the forces that they must transmit. In the clutch shown, six equally spaced radial keys are used. The flywheel web is provided with radial slots 27 which slidably receive the keys 26.

The walls of slots 27 form driving faces for engaging the keys and causing rotation of the plate 22 therewith. Each of the keys is bored and tapped to receive threaded hold back bolts 28. Disposed about bolt 28 and having one end thereof bearing against the bolt head is a compression spring 29. The other end of each spring 29 bears against a cup or like supporting member 31 which abuts the rear face of the flywheel web and serves to bridge the key slot therein. While not absolutely essential, it is preferable to provide plate 22 with as many hold back bolts as there are keys, in order that a uniform hold back pressure may be exerted upon the plate. It will thus be seen that the hold back bolts uniformly exert pressure on the plate 22 and urge it toward the flywheel web.

Plate 22 is caused to move away from the flywheel web against the action of springs 29 for clutching purposes by means of a centrifugal mechanism responsive to speed variations of the flywheel. The centrifugal mechanism weights 34, are preferably segmental in shape to fit within the flange of the flywheel and are preferably of the same number as the hold back spring bolts 28. Each weight 34 is provided with an inclined face 35 adapted to contact with the flywheel web when they are in their extreme outward position. The weights are further provided with elongated rectangular lever sections 36 of substantial width, which extend through chordal slots 37 formed in the flywheel web between the key slots 27. Lever sections 36 carry at their extremities, heads 38, each provided with a flat face 39 that abuts the bottom face of an elongated rectangular bearing recess 41 formed in automatic plate 22. Heads 38 are also provided with faces 42 adapted to abut the surface of the flywheel web, the edge of which is designed for fulcruming engagement therewith during operation of the weights. The heads have their outer sides relieved to provide knife-like edges 43 which are adapted to fulcrum and seat in the dihedral angle defined by the bottom and side walls of recesses 41.

It is accordingly apparent that as the speed of the flywheel increases each weight 34 will gradually swing outward about the edge 43 as a pivot in response to the rotation thereof. As this occurs faces 42 of the heads 38 will abut and slide on the flywheel web and the edge 43 will engage automatic plate 22, forcing the plate away from the web and into clutching engagement with facing 19 of disk 17. It will be noted that there is very little sliding engagement of parts in this arrangement since the contact at 43 is of a knife edge pivotal character. The sole sliding movement is at the edges of surfaces 42. This movement is small and little frictional resistance thereto exists so that the plate 22 is given a smooth and easy movement and clutch grabbing is avoided.

The mechanism associated with positive plate 23 will now be described. A combined housing and reacting member 44 is secured to the flywheel by a series of cap screws 45 threaded into the flywheel at 47. As seen in the upper part of Figure 1, the housing member 44 is provided with recesses 48 which receive tension springs 49, and are secured therein by means of pins or the like. The other end of springs 49 are secured to the rear face of plate 23. The springs urge the plate 23 away from the flywheel web and automatic plate 22 and clutch member 17.

Positive plate 23 is mounted for movement axially of shaft 11, and for rotation with housing 44, by means of studs 50 that are tapped into the rear face of plate 23, and have the head portion thereof slidably mounted in apertures formed in housing 44.

Plate 23 is resiliently urged toward plates 17 and 22 by springs 51 and 52, acting through the medium of clutch fingers 53. Clutch fingers 53 are evenly spaced about the periphery of the plate 23 and are enlarged and deflected at 54, to form fan blades. A rounded annular rib 55 is provided on the rear face of plate 23, and cooperates with a similar rib 56 formed on ring member 57 which is threaded into a cylindrical opening in cover member 44. Clutch fingers fulcrum on flanges 55 and 56 at one end, and are curved at the other end thereof.

The curved extremities of fingers 53 are clamped between the flanged end of a collar 58, and a spring retaining member 59. Collar 58 is provided with a flange 60, which seats in a groove 61 provided in clutch throwout sleeve 62. Springs 51 and 52 are seated upon and bear against member 59 at one end and an apertured reacting member 63, at the other end, which loosely receives sleeve 62, and is seated at its margin against a flange 64, formed on member 44. When the springs 51 and 52 are initially placed in position, spring 51 is put under substantial initial compression, while spring 52 merely rests loosely in the assembly for a purpose that will presently appear. Sleeve 62 is rotatably and slidably mounted on shaft 11, and it is seen that when it is moved to the left, springs 51 and 52 will be compressed and fingers 53 rotated to allow spring 49 to retract plate 23 away from plates 17 and 22, and interrupt driving connection between shafts 4 and 11.

A thrust-bearing assembly 65 is associated with sleeve 62 and is provided with ears 66. A clutch throwout shaft 67 provided with a yoke 68 is rotatably supported on clutch housing 1 and has fingers 69 formed thereon which cooperate with ears 66 for shifting the throwout device 62. A clutch pedal 71 is keyed to shaft 67 for providing foot control thereof.

The clutch is initially adjusted at the factory by rotating adjusting ring 57 in the proper direction to move positive plate 23 toward or away from automatic plate 22 to establish proper clearance between them. After the adjustment has been made ring 57 is locked in place by means of a set screw or the like, (not shown). After the clutch is in use all adjustments for wear are made externally thereof by means that will be hereinafter described.

The operation of the structure so far developed will now be described. As the flywheel is accelerated, the weights 34 will gradually swing out and pivot about edges 43, the edge of face 42 of head 38 will engage the flywheel web causing the automatic plate to be moved away from the web against the action of the springs 29 Due to the resisting action of springs 29, the movement of the weights will be under control and there will be no tendency for them to vibrate or undergo other undesirable movements. When the speed is sufficiently great, automatic plate 22 will engage facing 19 of driven clutch member 17. Upon further movement of the automatic plate clutch member 17 will slide longitudinally of the shaft 11 on splines 14 and 15. Facing 20 of clutch member 17 will then be brought into contact with positive plate 23. The portion of the operation that has just been described, will be termed hereafter as the first clutching stage.

The second clutching stages is initiated when facing 20 first contacts the face of the positive plate 23. As the pressure on positive plate 23 is further increased, spring 51, which is under substantial initial compression, resists the weight and plate movements and a torque of small magnitude is initially transmitted to the driven shaft 11. As spring 51 is further compressed the magnitude of the torque transmitted is gradually increased and shaft 11 is picked up evenly and without grabbing, with a slipping drive. When springs 51 has been sufficiently compressed so that spring 52 comes into play, the second stage of operation may be said to be at an end and the third stage commences. While the second and third stages of operation merge into each other insofar as actual operating characteristics are concerned, they are distinct to some extent in that full driving couple is not established until spring 52 is under substantial compression, at which time the third stage of the clutching operation may be said to be complete. The plates are then in firm driving engagement with each other and there is no slippage between the driving shaft and driven shaft.

In connection with this device it will be noted that when the clutch plates are disposed in their positively engaged positions, by pulling out dash control 105 with the motor operating at idling speeds or below the only force tending to hold the plates together is that caused by spring 51. This is not a disadvantage, however, because the clutch is only employed in this manner to turn the engine over by towing or coasting the vehicle for starting purposes, and since the plates are stationary with respect to each other when initially engaged, the static friction is sufficient to prevent slippage under these conditions.

In the automatic clutches that have been heretofore proposed, the positive plate is backed up by a single or a series of single springs, and accordingly, no staging of engaging pressures is effected in such devices. In the only types of slipping clutches that have beeen commercially successful in automotive drives, the clutch facings have been a special lubricated material having low coefficients of friction under low pressure, which gradually rise as the engaging pressure is increased, until, when full torque is being transmitted and no slippage exists, the coefficient of friction is fairly high. However, even at the upper limits, the coefficients are substantially below those of clutch facings in comparable conventional manually operable clutches, thus requiring the use of heavy backing springs to produce the proper frictional grip in such automatic clutches. The small available range of movement of the clutch plates between their fully engaged and disengaged positions, together with the necessary limitation of maximum pressures to permit convenient manual declutching of a practical automotive clutch, limits the available pressure differences between disengaged and fully engaged or non-slipping drive position to a comparatively narrow pressure range when a single series of backing springs is used. This necessitates the use of higher coefficients of friction when a single series of backing springs are used than is necessary with our improved clutch so far described embodying a multiple backing spring, since with our improved multiple spring arrangement, with the same movement of the automatic plate available, the initial engaging pressures may be materially lowered, and much higher final engaging pressures may be secured.

The lowering of initial engaging spring pressures secured by our improved construction permits easier manual declutching operations due to the lighter spring pressures at speeds where normal shift operations are performed in motor vehicle control, and permits the use of clutch facings containing larger percentages of lubricant and lower coefficients of friction with the same automatic plate movement, as compared to to the prior clutches embodying a single series of springs backing the positive plate. The lowering of coefficients of friction of the facing material secured in our improved clutch gives a smoother pick-up in slipping drive and longer clutch life. The use of the multiple springs to build up the operating pressures in stages permits a relatively slow building up of pressures at the lower clutch speeds when the clutch is picking up the load, and a rapid building up of pressures after the load is moving to secure a non-slipping drive, even with clutch facings containing as high as fifty to sixty percent or more of graphite in the original mixture from which the clutch facings are formed. Accordingly, while prior automatic clutches with a single spring or a series of backing springs have been found commercially practical, our improved clutch gives a materially improved smoothness in slipping drive, increased life, and easier normal declutching operation.

It will be noted that the fulcrum edges 43 of the weight levers as shown in Figure 1, are disposed approximately midway between the inner and outer periphery of plate 22, and hence the weight levers act upon the automatic plate in line contact and for a substantial distance across the face thereof, and apply substantially uniform pressure opposite the center of the engaging faces, minimizing warping and twisting of the plates under the pressures of operation. Uniform distribution of clutch fingers 53 around the positive plate provides uniform spring reactions for the clutch plates.

The operation of the clutch when taken in connection with the manual throwout means will be discussed in detail hereinafter, the parts in Figure 1 being shown in the positions that they assume when the clutch pedal is fully retracted and the clutch plates are in positively engaged or manually clutched position, and the engine is rotating at idling speeds, or is stationary.

Since slippage is inherent in the operation of a clutch of this type, solid lubricant is freed from the facings during operation. This freed material should be eliminated, and to this end means are provided for ventilating the clutch. The clutch housing 1 is provided with an aperture 72, in which is mounted a suitably shaped air deflecting member, or funnel 73, the lower end of which terminates as near as possible to the axis of rotation of the clutch members. This arrangement also cools the clutch when slipping. The air flow induced by the action of the fan blades 54 is drawn into the funnel member 73, and along the shaft 11 toward the clutch plates. A portion of the air stream, when the plates are disengaged, passes between the facing 20 and the plate 23 and the plate 23 and the cover 44 on one side of the plate 17, and a part of the air stream passes through openings 18 in plate 17 and between the facing 19 and the plate 22 removing dust and solid free lubricant in the air stream. An air stream also passes between plate 22 and flywheel web 7. The air passes over the facings and the entrained dust is exhausted from the clutch structure into the clutch housing space by means of apertures 74 formed therein.

The fan blades 54 are made of a sufficient size and are inclined at the proper angle to produce the required air current through the clutch mechanism. However, if desired the fan blades may be eliminated and the rotation of the clutch parts may be relied upon to induce the cooling circulation. While it is to be understood that the fan blades or impeller elements could be mounted on one or both of the plates 22 and 23, it is preferable to form them from the clutch fingers so that the air is taken from the side of the fly-wheel opposite the engine to avoid building up a sub-atmospheric pressure adjacent the pilot bearing, sufficient to draw oil from the engine crankcase, and is distributed on both sides of the plates and hence the dissipation of heat from each side is approximately equal. Therefore, warping or distorting tendencies produced by uneven expansion of the metal which in turn is caused by non-uniform heat content thereof are avoided, for the reason that the entire area of each of the plates is maintained at a substantially uniform temperature.

In order to prevent the air exhausted from apertures 74 from reentering the clutch mechanism, an annular baffle 74' is formed on the inner wall of the clutch housing. This materially increases the air circulating abilities of the clutch mechanism.

While the heated air may be withdrawn or exhausted from the clutch housing 3 by providing suitable apertures therein, we prefer to provide a single aperture associated with a suitable valve for controlling the air since it is desirable in cold weather to vary the dissipation of heat from the clutch parts due to the fact that the frictional coefficients of the facings decrease as the temperature increases, and by controlling the temperature properly the clutch operating characteristics may be varied or controlled. For this purpose an aperture 75 is formed in the upper portion of the clutch housing, and a valve member 76 secured thereto by means of suitable fastening elements such as screws 77. Hinged to this valve member, as at 78, is a flap valve 79 having an apertured lever 80 provided thereon. Pivoted on lever 80 is a wire member 81 which is housed in a flexible member 82. The wire and housing members form a part of the well known Bowden wire construction and it is intended that the upper end of the housing 82 be mounted on the vehicle dashboard or the like for convenient manipulation by the vehicle operator. The operator of the vehicle then can thus readily adjust the flow of ventilating air through the clutch and thus properly compensate for both the variation of heat and dust generated in the clutch and the initial temperature of the ventilating air. This is important since the coefficient of friction of the friction surfaces is dependent upon the temperature, and as the amount of slippage depends upon the coefficient of friction, extreme conditions can cause either harsh or chattering engagement on one hand or extreme slipping on the other hand.

From a consideration of the structure developed so far, it will be seen that automatic plate 22 is moved by the centrifugal weights a certain distance, which is limited by contact of the weights with the flywheel web. Accordingly, if at this time, the positive plate can be moved to the left sufficiently so that the clutch member 17 will not be clamped between it and automatic plate 22, no driving effort can be transmitted from the driving to the driven shaft even though the centrifugal weights are in their outermost position. Moreover, if positive plate 23 is allowed to move to the right sufficiently to clamp the clutch member 17 between it and the automatic plate with sufficient pressure when the automatic plate is in retracted position with the centrifugal weights in the position they would take when the engine is idling or stationary, it will be seen that a driving connection will be secured. Such operation is desirable or even necessary for several reasons, for instance, in the winter when the motor is stiff or when the battery is low, it is desirable to connect the clutch driving and driven members in positive engagement with the engine dead so that the car can be pushed or coasted in order to turn the engine over, or when stopping on a steep hill, a positive engagement of the clutch in low or reverse gear will provide an additional emergency brake that cannot be inadvertently disengaged, or if the motor stalls, due to lack of fuel or from other causes, the car can be pulled out of any dangerous position by driving the car in low gear with the starting motor.

For this purpose we have disclosed a locking means which is adapted to selectively hold the positive plate in such a position that it will be out of contact with the other clutch plates when the engine is operating at idling speeds, or is stationary. Referring more particularly to Figures 2 and 3, clutch throwout shaft 67 is provided with a lever member 85 which is secured thereto for rotation therewith by means of a key 86 or the like, and is held thereon by means of a cotter pin 87. Member 85 threadedly receives a bolt 88 which is provided with a locking nut 89.

Clamped to the rear face of housing 1 by means of housing bolts 2, is a plate 91 which supports the latching means. Pivoted on plate 91 by means of a cap screw 92 or the like is a latching member 93, having an inclined cam face 94 and a latching face 95. Member 93 is normally urged into latching position by spring 96 secured at one end of an ear 97 of plate 91, and the other end is hooked over the latch member at 98. With the parts in the positions shown in Figure 2, bolt 88 contacts the face of plate 91, and the clutch pedal 71 is disposed in its fully retracted position. At this time sleeve 62 is in its extreme right hand position (Figure 1) and the clutch plates are in tight engagement, thus effecting a direct drive from the driving to the driven shaft.

When latch member 93 is swung up, with the latching face 95 under the bolt 88, it spaces bolt 88 from plate 91, and the clutch pedal is held in its intermediate or automatic position which causes sleeve 62 to be held to the left a sufficient distance to maintain the clutch plates in spaced relation when the engine is idling or stationary. Member 93 is limited in its upward swinging movement by means of a stop 99 which is preferably struck out of plate 91. Member 93 is moved into unlocked position by means of a Bowden wire assembly 101, which is clamped to the plate 91 by means of a clip 102 or the like. The actuating wire 103 of the Bowden wire assembly is operatively associated with slot 104 formed in an ear of the latching member 93. The Bowden wire control is led up the dashboard and the operating knob 105 thereof is mounted thereon in a convenient location for operation by the vehicle operator.

When it is desired to effect a positive drive from the driving to the driven shaft, for the purpose of either starting the engine, braking the car or driving the car with starter as previously explained,—knob 105 is pulled out which swings the clutch control member 93 into the proper position shown in Figure 2, which operation allows the clutch pedal to drop back into fully retracted position, thus effecting engagement of the clutch members. When it is desired to bring the clutch pedal into its intermediate or automatic position again, knob 105 is pushed in.

It is not necessary that the clutch pedal be depressed at this time, for the reason that when knob 105 is pushed in, actuating wire 103 will merely slide downwardly in slot 104, and thereafter, upon the manual depression of the clutch pedal, spring 96 will move the latch member 93 to bring the latching face 95 thereof underneath the bolt 88 and thereby prevent the clutch pedal from being returned to retracted position.

When installing our improved clutch in a vehicle, the parts are locked in the position they assume in Figure 3 of the drawings, for the purpose of establishing the proper idle release clearance between the clutch plates. Locknut 89 is backed away and the bolt 88 rotated in the proper direction to withdraw plate 23, and give ample release clearance between it and the other clutch plates while the motor is stationary or operating at idling speed. To ascertain when the adjustment is correct, the brakes are released and the bolt 88 is rotated until the engine, when idling, is felt to transmit a small amount of torque to the rear wheels of the vehicle. The bolt 88 is then operated in the opposite direction until the plate 23 no longer delivers torque. When the adjustment is correct, locknut 89 is turned up to lock bolt 88 in adjusted position.

With the parts in the position shown in Figure 3, if it is desired to start the vehicle, and the vehicle is on level ground, the transmission is placed in high gear and the engine accelerated. As the engine gains speed the weights 34 gradually swing out, and cause automatic plate 22 to move toward and engage and force clutch member 17 against positive plate 23. The clutch then, under automatic operation, transmits a gradually increasing driving torque to the rear wheels and the vehicle is started. When the vehicle, and consequently the engine, attains sufficient speed, the weights will have swung out to their furthermost limits and the plates will be in tight engagement with no slippage between them, and an automatic positive drive from the driving to the driven shaft is effected. If in the automatic position there is engagement while the motor is idling, due to too close disposition of the plates 22 and 23, this condition may be readily remedied by backing plate 23 away from the automatic plate by manipulating bolt 88 in the proper direction. When operating the vehicle in this manner, all that is necessary to bring it to a stop, is to release the accelerator and apply the brakes. When the vehicle has decelerated to a speed that corresponds substantially to engine idling speed, the centrifugal mechanism will release the clutch, and the vehicle may be brought to a complete stop by continued application of the brake. Or, if traffic conditions permit, the accelerator may be depressed and the engine speed accelerated causing almost immediate reengagement of the clutch, and the vehicle will be picked up in high gear.

When the automatic plate has moved to engaging position against the action of its holdback springs, the positive plate may be backed away from the remaining clutch plates by manual depression of the clutch pedal. Hence, there is no contact between the plates, and no driving connection between the driving and driven shaft. In traffic, when it is desired to get the car away quickly, and in starting on steep grades, the clutch pedal may be operated in this manner to disengage the clutch between each gear shifting operation as in a vehicle which is provided with a conventional type of manually operable clutch, however it is contemplated to start the vehicle in high gear under normal operating conditions.

In connection with the device so far developed it will be seen that we have provided a device which provides controlled free-wheeling without the necessity of interposing a free-wheeling unit between the engine and final drive. Assuming that the vehicle is operating in high gear and at a substantial speed, all that it is necessary to free-wheel is to release the accelerator and momentarily depress the clutch pedal, and shortly thereafter, due to the engine dropping to idling speed, the weights will cause separation of the clutch plates. The clutch pedal is then released and returned against the latch face 95. The car will then coast as there is no torque transmitting connection between the engine and the rear wheels. When it is again desired to drive the vehicle under engine power, the engine is accelerated, which will cause the centrifugal mechanism to reengage the clutch members.

The description of the device so far has proceeded on the assumption that the automatic clutch was associated with a conventional automobile transmission having three speeds forward and reverse. This type of clutch functions very well with the transmission of this character. However, in the present instance we have shown it in combination with a transmission that has two speeds forward and reverse. We are able to use a transmission of this character and obtain all the desirable operating characteristics of a three speed transmission for the reason that the automatic clutch, when the vehicle is operating in high gear and encounters a grade that is too steep for direct drive, will slip and give the vehicle operating characteristics that are similar to those of a car provided with a second or intermediate speed. Any conventional form of two speed transmission may be employed and hence the one illustrated in Figure 1 will only be briefly described.

In Figure 1, a gear housing 110 having a gear shift lever 113 and a selector fork assembly designated generally as 114, is secured to clutch housing 1 in any well known manner. A shaft 119 is supported at one end in a bearing 121 in the end of shaft 11. Shaft 11 carries a gear 120 which meshes with a gear assembly 124, 125 and 126, supported on a countershaft 122. A gear 129 is slidably mounted upon shaft 119 and cooperates with a slidable idler gear (not shown); gear 125; and gear 120 for transmitting power from shaft 11 to shaft 119 at a forward speed reduction ratio, a direct drive ratio and a reverse drive ratio.

A clutch and transmission assembly of this character, in addition to giving the performance of a conventional manually operable clutch and transmission having three speeds forward and reverse, will allow normal car operation with much less manual operation on the part of the driver. For instance, if the vehicle is proceeding in high gear, and a grade is reached that would normally require a conventional vehicle to shift into second gear, a vehicle provided with a drive of the character pointed out will allow the transmission to remain in high gear, and when the engine encounters the load and tends to be decelerated, the clutch pressure will be decreased by virtue of a partial retraction of the centrifugal mechanism, and a slipping drive between the driving and driven shaft will be effected, thus carrying the vehicle up the grade in a slipping drive. As soon as the grade has diminished, the engine will again pick the vehicle up in direct drive due to an increased clutch pressure effected by the centrifugal mechanism.

In Figure 4 we have shown a modified form of automatic clutch which employs a different type of ventilation system than that shown in Figure 1.

As shown in Figure 4 a supporting member 150, suitably connected to an engine or other prime mover, is secured by means of bolts 151 to a clutch housing 153. Engine or driving shaft 154 extends into the housing 153 and is provided on the end thereof with a flange 155. Secured to the flange 155, in any suitable manner, as by bolts 156, is the web portion 157 of a flywheel 158. Flywheel 158 is provided on its periphery with the usual starting gear 159.

Disposed in axial alignment with the shaft 154, and mounted for rotation, is driven shaft 161, which is reduced at 162 at one end and journaled in a suitable anti-friction bearing assembly 163 secured in the flywheel web, and is adapted to have the other end thereof operably connected to a suitable gear changing apparatus for amplifying the torque applied to the final driven member. Driven shaft 161 has a splined portion 164 on which the correspondingly splined hub 165 is slidably mounted. Hub 165 is provided with a substantial flange 166 to which is suitably secured in any suitable manner, as by welding, riveting or the like, a relatively thin metal disk 167, which constitutes the driven clutch disk or member. Disk 167 has blades 168 struck out of the body thereof adjacent its junction with the flange 166. These blades, as shown in the drawings, are so disposed, that when the engine shaft rotates in the direction indicated by the arrow, a current of air will be drawn into the center of the clutch and forced by said blades to move outward over the clutch disk and parts for a purpose that will more fully hereinafter appear. Each face of disk 167, near the periphery thereof, is provided with a facing 169 and 170, respectively, which may consist of any material that has the required characteristics to give the correct frictional gripping force, and at the same time has wearing qualities adapting it for this purpose. We prefer, however, to use the lubricated type of material described in connection with Figure 1.

Frictional facings 169 and 170 may be secured to the disk 167 in any suitable manner, as for instance by means of rivets or the like. Each of the facings 169 and 170, cooperates with a suitable annular plate for effecting a driving connection between the driving shaft 4 and the driven shaft 11. Plate 172 engaging the facing 169, we term the automatic plate, and plate 173 engaging the facing 170 is termed the positive plate.

The construction of the automatic plate 172 and its actuating mechanism will now be described. Plate 172 has a pair of peripheral strengthening ribs 174 formed on one face thereof. These ribs give the plate rigidity, and prevent distortion or warpage thereof. Integral radial keys 175 are formed on one face of the plate and are integral at their ends with the strengthening ribs 174. The number of keys employed in a particular installation is determined by a consideration of the forces that they must transmit. In the clutch shown six equally spaced radial keys are used. The flywheel web is provided with an annular boss 176 having radial slots 177 formed therein which slidably receive the keys 175. The walls of slots 177 form driving faces for engaging the keys and causing rotation of the plate 172 therewith. Each of the keys is bored and tapped to receive threaded hold back bolts 178. Disposed about each bolt 178, and having one end thereof bearing against the bolt head is a compression spring 179. The other end of each spring 179 rests in a recess 181, formed in the flywheel web. While not absolutely essential, it is preferable to provide plate 172 with as many hold back bolts as there are keys, in order that a uniform hold back pressure may be exerted upon the plate. It will thus be seen that the hold back bolts uniformly exert pressure on the plate 172 and urge it toward the flywheel web tending to cause face ribs 174 thereof to abut flywheel web 157.

Plate 172 is caused to move towards the flywheel web against the action of springs 179 for clutching purposes by means of a centrifugal mechanism responsive to speed variations of the flywheel. The centrifugal mechanism weights 184 are preferably segmental in shape to fit within the flange of the flywheel and are preferably of the same number as the hold back spring bolts 178. Each weight 184 is provided with an inclined face 185 adapted to contact with the flywheel rim when they are in their extreme outward positions. The weights are further provided with elongated rectangular lever sections 186 of substantial width, which extend through chordal slots 187 formed in the flywheel web. Lever sections 186 carry at their extremities, heads 188, each provided with a flat face 189 that abuts the face of plate 172 which with chordal ribs 190 forms an elongated rectangular bearing recess in automatic plate 172. Heads 188 are also provided with faces 192 adapted to abut the surface of the flywheel web, the edge of which is designed for fulcruming engagement therewith during operation of the weights. The heads have their outer sides relieved to provide knife-like edges 193 which are adapted to fulcrum and seat in the dihedral angle defined by the face of plate 172 and the side wall of rib 190.

It will therefore be seen that as the speed of the flywheel increases each weight 184 will gradually swing outward about the edge 193 as a pivot in response to the rotation thereof. As this occurs faces 192 of the heads 188 will abut and slide on the flywheel web and the edge 193 will engage automatic plate 172, forcing the plate away from the web and into clutching engagement with facing 169 of disk 167. It will be noted that there is very little sliding engagement of parts in this arrangement since they function in the same manner as those of Figure 1.

The mechanism associated with positive plate 173 will now be described. A combined housing and reacting member 194 is secured to the flywheel by a series of cap screws 195 which are threaded into the flywheel at 197. As seen in the lower part of Figure 4, the housing member 194 is provided with retainers 198 in which are seated compression springs 199 and 200 in turn seated at their other ends in retainers 201 which are provided with studs 202 which are formed in recesses in the rear face of plate 173. The springs urge the plate 173 towards the flywheel web and towards automatic plate 172 and clutch member 167. When positive plate 173 is assembled with the rest of the mechanism the springs 199, which are lighter and longer than the springs 200, are placed under considerable initial compression and the springs 200 are not placed under any compression, but are merely loosely disposed in their sockets for a purpose that will presently appear.

Positive plate 173 is keyed to housing 194 for rotation therewith by means of studs 194' which are passed through apertures in housing 194 and have their ends upset thereagainst. The free ends of the studs seat in slots formed in positive plate 173.

The positive plate is adapted to be withdrawn from the other clutch members against the action of springs 199 and 200 by means of clutch fingers 204, which are fulcrumed in apertures 205 formed in housing 194. Fingers 204 cooperate with fulcrum members 206 which are adjustably held on studs 207 by means of a locknut 208. Studs 207 extend through apertures 209 in housing 194, and are rigidly secured to plate 173 in any suitable manner. Springs 210 serve to hold the parts in engaged position and prevent vibration thereof. By rotating nuts 208 the relation between studs 207 and fingers 204 may be adjusted and thus vary the relation thereof and the clutch plates. After the initial adjustment of clutches at the factory all service adjustments for plate wear may be made externally of the clutch as will be pointed out hereinafter.

Clutch fingers 204 are provided with curved faces 213 which cooperate with a clutch throwout bearing assembly denoted generically at 214, mounted on a sleeve member 215, in turn slidably mounted on a stationary hollow supporting member 216, through which the shaft 161 extends. Sleeve member 215 is urged to retracted position by means of a tension spring 217 which is secured thereto, and at the other end to a suitable part of the housing 153. This spring is relatively light since its sole function is to keep the bearing assembly 214 out of contact with the fingers 204. Sleeve 215 is moved toward the clutch fingers against the action of spring 217 by means of lever members 219 which have curved extremities 221 abutting cooperating bosses 222 formed on sleeve 216. Levers 219 are keyed by means of pins 223 or the like to a shaft 224, upon which is mounted, exteriorly of the clutch housing, a conventional clutch throwout pedal (not shown).

The operation of the structure so far developed will now be described. As the flywheel is accelerated, the weights 184 will gradually swing out and pivot about the point 193, the edge of face 192 of head 188 will engage the flywheel web forcing the automatic plate to be moved away from the web against the action of the springs 179. Due to the resisting action of springs 179, the movement of the weights will be under control and there will be no tendency for them to vibrate or undergo other undesirable movements. When the speed is sufficiently great, automatic plate 172 will engage facing 169 of driven clutch member 167. Upon further movement of the automatic plate, clutch member 167 will slide longitudinally of the shaft 161 on splines 164 and 165. Facing 170 of clutch member 167 will then be brought into contact with positive plate 173. The portion of the operation that has just been described, will be termed hereafter as the first clutching stage.

The second clutching stage is initiated when facing 170 first contacts the face of the positive plate 173. As the pressure on positive plate 173 is further increased, springs 199, which are under substantial initial compression, resist the weight and plate movements and a torque of small magnitude is initially transmitted to the driven shaft 161. As spring 199 is further compressed the magnitude of the torque transmitted is gradually increased and shaft 161 is picked up evenly and without grabbing, with a slipping drive. When spring 199 has been sufficiently compressed so that spring 200 comes into play, the second stage of operation may be said to be at an end and the third stage commences. While the second and third stages of operation merge into each other insofar as actual operating characteristics are concerned, they are distinct to some extent in that full driving couple is not established until spring 200 is under substantial compression, at which time the third stage of the clutching operation may be said to be complete. The plates are then in firm driving engagement with each other and there is no slippage between the driving shaft and driven shaft.

In connection with this device it will be noted that when the clutch plates are disposed in their positively engaged positions, the only force tending to hold the plates together is that caused by springs 199. This is not a disadvantage however, as explained in connection with the device shown in Figure 1, the clutch is only occasionally employed in this manner to start engine, brake car or drive the car with the starter, and since the plates are stationary with respect to each other when initially engaged, the static friction is sufficient to prevent slippage under these low torque conditions.

In the automatic clutches that have been heretofore proposed, the positive plate is backed up by a series of single springs, and accordingly, no staging of engaging pressures is effected in such devices. In the only types of slipping clutches that have been commercially successful in automotive drives, the clutch facings have been a special lubricated material having low coefficients of friction under low pressure, which gradually rise as the engaging pressure is increased, until, when full torque is being transmitted and no slippage exists, the coefficient of friction is fairly high. However, even at the upper limits, the coefficient are substantially below those of clutch facings in comparable conventional manually operable clutches requiring the use of heavy backing springs to produce the proper frictional grip in such automatic clutches. The small available range of movement of the clutch plates between their fully engaged and disengaged positions, together with the necessary limitation of maximum pressures to permit convenient manual declutching of a practical automotive clutch, limits the available pressure difference between disengaged and fully engaged or non-slipping drive position to a comparatively narrow pressure range when a single series of backing springs is used. This necessitates the use of higher coefficients of friction when a single series of backing springs are used than is necessary with our improved clutch so far described embodying the multiple series of backing springs, since with our improved multiple spring arrangement, with the same movement of the automatic plate available, the initial engaging pressures may be materially lowered, and much higher final engaging pressures may be secured. The lowering of initial engaging spring pressures secured by our improved construction permits easier manual declutching operations due to the lighter spring pressures at speeds where normal shift operations are performed in motor vehicle control, and permits the use of clutch facings containing larger percentages of lubricant and lower coefficients of friction with the same automatic plate movement, as compared to the prior clutches embodying a single series of springs backing the positive plate.

The lowering of coefficients of friction of the facing material secured in our improved clutch gives a smoother pick-up in slipping drive and longer clutch life. The use of the multiple springs to build up the operating pressures in stages permits a relatively slow building up of pressures at the lower clutch speeds when the clutch is picking up the load, and a rapid building up of pressures after the load is moving to secure a non-slipping drive, even with clutch facings containing as high as fifty to sixty percent or more of graphite in the original mixture from which the clutch facings are formed. Accordingly, while prior automatic clutches with a single series of backing springs have been found commercially practical, our improved clutch gives a materially improved smoothness in slipping drive, increased life, and easier normal declutching operation.

It will be noted that the fulcrum edges 193 of the weight levers as shown in Figure 4, are disposed approximately midway between the inner and outer periphery of plate 172, and hence the weight levers act upon the automatic plate in line contact and for a substantial distance along the face thereof, applying substantially uniform pressure opposite the center of the engaging faces minimizing warping and twisting tendencies of the plates under the pressures of operation. Uniform distribution of springs 199 and 200 around the positive plate provides uniform spring reactions for the clutch plates. Moreover the ribs 174 and 190 are very effective in practice for uniformly dissipating the heat generated in plate 172, which, if allowed to become localized, would cause uneven expansion and consequent distortion thereof.

This form of clutch is ventilated in a manner similar to that previously described. Housing 153 is provided with an inspection aperture 225, in which is mounted a cover provided with a suitably shaped air deflecting member, or funnel 226, the lower end of which terminates as near as possible to the axis of rotation of the clutch members. This arrangement also cools the clutch when slipping. The air flow induced by the action of the fan blades 168 is drawn into the funnel member 226, and along the shaft 161 toward the clutch plates. A portion of the air stream, when the plates are disengaged passes between the facing 169 and the plate 172 and the plate 172 and the flywheel web 157 on one side of the plate 167 and on the other side of the plate the air passes between the facing 170 and the plate 173 removing dust and solid free lubricant in the air stream. The air passes over the facings and the entrained dust is exhausted from the clutch structure into the clutch housing space by means of the apertures 227 formed therein.

The fan blades 168 are made of sufficient size and are inclined at the proper angle to produce the required air current through the clutch mechanism. However, if desired the fan blades may be eliminated and the rotation of clutch parts may be relied upon to induce the cooling circulation. While it is to be understood that the fan blades or air impeller elements could be mounted on one or both of the plates 172 and 173, it is preferable to strike them out of member 167, so that the air is distributed over both sides of each of the plates and hence the dissipation of heat from each side thereof is approximately equal. Therefore, warping or distorting tendencies produced by uneven expansion of the metal which in turn is caused by non-uniform heat contact thereof are avoided, for the reason that the entire area of each of the plates is maintained at a substantially uniform temperature.

This form of the clutch is preferably provided with a valved clutch housing air outlet of the type shown in connection with Figure 1 of the drawings for varying the clutch characteristics at the will of the operator.

The clutch pedal employed in this device is preferably associated with a latch for holding it in automatic position.

In Figure 5 we have disclosed a further modified form of automatic clutch which is especially adapted for industrial drives, and may very advantageously be employed in connection with Pullman coach generator driving mechanisms. Referring to Figure 5, a clutch housing 230 is suitably connected to a prime mover or other source of rotational energy, and is provided with a bearing 231 in which is journaled engine shaft 232. Shaft 232 is provided with a flange 233 to which is suitably secured web 234 of a flywheel 235.

Disposed in axial alignment with shaft 232 is a driven shaft 236 which is reduced at 237 at one end thereof and journaled in a suitable antifriction bearing assembly 238 secured in the flywheel web, and is adapted to have the other end thereof operatively connected to the device that is to be driven or a suitable gear changing apparatus for multiplying the torque transmitted to the driven member. Driven shaft 236 has a splined portion 239 upon which a correspondingly splined hub 241 is slidably mounted. Hub 241 is provided with a flange 242, to which is secured, in any suitable manner, as by welding, riveting or the like, a relatively thin metal disk 243, which constitutes the driven clutch disk or member.

Each face of disk 243, near the periphery thereof, is provided with an annular frictional facing 244 and 245 respectively which preferably consists of the material that has been described in connection with the automatic clutches shown in Figures 1 and 4. Frictional facings 244 and 245 may be secured to the disk 243 in any suitable manner as for instance by means of rivets or the like. Frictional facing 244 cooperates with the flywheel web 234 and frictional facing 245 cooperates with a clutch plate 246 for effecting a driving connection between the driving shaft 232 and the driven shaft 236. In this connection it is seen that flywheel web 234 constitutes a clutch plate, and hereinafter it will be designated broadly as the positive plate. Plate 246 is designated as the automatic plate. Automatic plate 246 is caused to move over and clamp clutch member 243 between it and the flywheel web 234 by means that will presently be described.

Extending circumferentially about the clutch plate structure and seating in a groove formed in the flywheel web, in an apertured cylindrical shell 247, having key slots 248 formed therein, which is rigidly secured in the flywheel structure in any suitable manner and constitutes a stop. Cooperating with stop 247 is a disk-like member 249 which acts as a yielding reacting member for the centrifugal means and it will be referred to hereinafter as a reaction plate. Plate 249 is provided with keys 250 which seat in key slots 248 providing a driving connection and the plate is urged toward the flywheel web and the stop member 247 by means of a series of spring units. These spring units consist of a pair of compression springs 251 and 252 which seat in clutch housing member 253 at one end thereof and in suitable recesses formed in reaction member 249 at their other ends. When the assembling of spring units in the device, springs 252 are merely disposed loosely in their respective sockets, while springs 251, which are lighter than springs 252, are placed under a substantial initial compression for a purpose that will presently appear.

Automatic plate 246 is urged toward the reacting member 249 by means of a series of studs 254 having reduced portions 255 inserted in automatic plate 246 and having the ends thereof headed over. Studs 254 are encircled by compression springs 256 which bear against the heads of the studs and seat in recesses formed in the automatic plate.

Plate 246 is caused to move over into frictional engagement with driven member 243 for clutching operations by means of centrifugal weights 258, provided with lever sections 259, which extend through apertures 260 formed in reaction plate 249, and also through bosses 261 formed thereon. Bosses 261 constitute driving keys, and seat in driving engagement in key slots 261' formed in automatic plate 246. It is therefore seen that automatic plate 246 may move axially, but is caused to rotate with reaction plate 249. Sections 259 carry at their extremities heads 262, each provided with a flat face 263 that abuts the bottom face of an elongated rectangular bearing recess 264 formed in automatic plate 246. Heads 262 are also provided with faces 265 adapted to abut and fulcrum in recesses 266 formed in boss 261. Heads 262 have their outer sides relieved to provide knife-like edges 267 which are adapted to seat and fulcrum in the dihedral angle defined by the bottom and side walls of recesses 264.

It will therefore be seen, that as the speed of the fly-wheel increases, weights 258 will gradually swing outward about their edges 267 as a pivot in response to centrifugal force. As this occurs, faces 265 of heads 262 will abut and fulcrum in socket 266 and edge 267 will engage automatic plate 246 forcing it and the reaction plate 249 mutually away from each other.

It is further seen, that although plates 246 and 249 are positively forced apart, this positive forcing action is not imparted directly to the driven member 243 and the member 234 for the reason that springs 251 and 252 are interposed between the reaction plate and housing or cover member 253, thus establishing a resilient yielding connection between the members. Moreover, due to the unequal compression existing in the springs, pressure staging of the clutching operation is effected in a manner, similar to that described in connection with the automatic clutches disclosed in Figures 1 and 4 of the drawings.

Cooling of the clutch elements, and disposition of the freed clutch material is effected in a manner similar to that previously described in connection with the other forms of clutches illustrated. To this end a plurality of radial fins 271 are formed on the flywheel 235 and are so disposed as to lie opposite the area cooperating with facing 244. Rotation of the flywheel causes the fins or fan blades 271 to induce a draft of air to flow through openings 272 formed in the clutch housing, thence over the flywheel face then out through openings 277 formed in the periphery of the flywheel rim. This effects a rapid and uniform abstraction of heat from the positive plate 234. Distorting tendencies of this member during slipping drive conditions are accordingly obviated.

The automatic plate is ventilated by means of a plurality of radially extending apertures 275 formed therein. A plurality of apertures 276 are formed in flywheel web near the center thereof for the purpose of causing a stream of air to flow axially of the clutch from right to left, through the action of fan blades 271. A portion of this axial air stream passes through aperture 278 between facing 244 and positive clutching face 234, and thence through the apertures in shell 248, through apertures 277 formed in the flywheel rim and thence to the atmosphere through apertures 273 formed in the clutch housing. Another portion of this air stream passes between facing 245 and automatic plate 246 to the atmosphere. A still further portion of the air stream enters the various apertures 275 formed in the automatic plate, extracting heat therefrom and then passing to the atmosphere. It is therefore seen that the heat is uniformly abstracted from the clutch parts as it is generated therein, and also that any particles of freed clutch facing material are effectively removed from the clutch housing.

It is to be understood that the exhaust ports 273 of the clutch housing may be associated with suitable valve means if desired.

In Figures 6 to 11 inclusive, we have illustrated driven clutch members that may be advantageously employed in any of the automatic clutches disclosed herein, and are especially adapted for this purpose for the reason that means are provided for cooling the driving faces of the plates while they are in driving engagement with their corresponding driving members.

Referring to Figures 6 and 9, driven clutch plate 280, having fan blades 281 struck from the body thereof, is provided with radial slots 282 which extend to the periphery of the disk and are contiguous at their inner ends with the fan blade apertures 283. Segmental sections 284 of clutch facing material are secured to each side of the plate in spaced relationship providing a radial slot 285 between each segment. The sections may be secured to the plate in any suitable manner, but are preferably bored at 286 and counter bored at 287 and held in place by rivets 288 passing therethrough and through corresponding apertures in the plate 280.

When this type of clutch member is in operation in an automatic clutch of the type previously described, and the clutch plates are disengaged, the air induced by the fan blades 281 will flow outwardly through radial slots 282 and through passages 285 defined by the clutch facing segments. In addition air will flow over the entire face of the clutch facing segments and the surfaces of the automatic and positive plates, and cooling of the clutch elements under these conditions will be very rapid. When the plates are in driving engagement, for instance, when the clutch is picking up the load, the heat generated by slippage will be dissipated by virtue of the cooling air stream passing through the slots 282 and through the passages 285. It has been found in practice that this type of clutch member produces very effective cooling of the driven clutch member and the automatic and positive clutch plates throughout all phases of operation.

In Figures 7 and 10 clutch plate 289 is disclosed having fan blades 291 struck from the body thereof in a similar manner to the device shown in Figures 6 and 9. The clutch plate shown in these figures however is not slotted. Segments of clutch facing material 292 are secured in spaced relationship to opposite sides of the clutch plate near the periphery thereof, and they are so arranged that the segments on one side of the plate are staggered with respect to those on the other side thereof. The cooling and ventilating functions of this clutch plate are similar to that shown in Figure 6, except that the air, in passing radially outward to passages 293, while the plates are in tight engagement abstracts heat from the two adjacent sections on the same side of the clutch plate 289 and at the same time abstracts heat from the central portion of the segment which is disposed on the other side of the clutch plates. When the clutch plates are disengaged or in spaced relation air flows outwardly over the entire face thereof removing any particles of freed lubricant and rapidly abstracting heat therefrom.

Referring to Figures 8 and 11, a clutch plate 295 has semi-circular fan blades 296 struck from the body thereof and also radial slots 297 formed therein which extend to the periphery thereof at one end and are contiguous at the other end thereof with the fan blade apertures 298. Secured to each side of the plate in the region of the periphery thereof, are segments of clutch facing material 299 which extend over the face of the plate and terminate at the slot 297 formed therein. These segments are secured to the plate in the same manner as that disclosed in connection with Figures 6 to 10, inclusive.

The cooling air, when the clutch is disengaged, flows over both sides of the plate and outwardly over the clutch facing 299 thus removing any freed lubricant and at the same time rapidly abstracting heat therefrom. When the clutch plate is clamped between the automatic and positive plates in driving engagement, very little air can pass over the surface of the segments 299, but the air, in being thus confined, flows with increased force through slots 297 which accordingly abstracts the heat from each end of each of the clutch facing segments and from the automatic and positive plates in the region thereof.

The illustrations of driven clutch plates that we have above illustrated, are merely indicative of various means that may be employed for cooling the clutch plates while they are in engagement with their driving members, and it is to be understood that the clutch facing material might be secured to the positive and automatic plates respectively along with the fan blades, and cooling thereof would be equally efficacious.

In Figure 12 we have disclosed a somewhat different cooling arrangement and in this figure we have illustrated the clutch shown in Figure 4 as associated therewith. Referring to this figure, driven clutch member 301 is provided with a series of apertures 302 which are located near hub 165. Each aperture 302 communicates with a radial passage 303, formed in member 301, which communicates with and extends from aperture 302, to the periphery of member 301. Automatic plate 304 has a facing 305 secured thereto by any suitable means as for instance rivets 306. The positive plate 307 is similarly provided with a face 308 which is secured thereto by rivets 306. Automatic and positive plates 304 and 307 respectively, which are relatively large for the purpose of giving them rigidity, are cored out wherever possible such as at 310 for the purpose of allowing air currents to pass therethrough and accordingly remove the heat generated therein.

When this clutch is in operation, and the automatic and positive plates are in driving engagement with the driven member 301, the cooling air is prevented from flowing between the plates due to their substantially sealing contact and accordingly it must flow through the cored out portions in the automatic and positive plates thereby abstracting heat therefrom. The air current that is induced in the passages 302 and 303 in the clutch member also effectively cools the driving region of the automatic and positive plates during slipping drive conditions. When the clutch is disengaged the air flow is substantially the same as when the clutch parts are in engagement except that the air can now flow between the plates and remove any freed lubricant and exert further cooling effects upon the plate surfaces.

In Figure 13 we have disclosed a clutch assembly having a driven member 315 of special construction. When the intake air supply for the clutch mechanism is drawn from the engine crankcase in a manner hereinafter described, it is desirable to prevent the oil vapor or solid lubricating dust from coming in direct contact with the friction facing. Driven member 315 is accordingly provided with annular deflecting rings 316 which are disposed on each face thereof and are secured thereto by means of rivets 317 or the like. Driven member 315 is provided with friction facings 318, which cooperate with an automatic plate 319 and a positive plate 320 in the manner previously described.

It is seen that the air in flowing outward over the surfaces of the driven member 315, strikes the deflecting rings 316 and is directed outwardly over the surfaces of the automatic and positive plate. The desirable effect obtained with the devices shown in Figures 6 to 11 of the drawings is not lost, through the provision of these deflecting rings, for the reason that a portion of the air stream makes a sharp reverse turn over the edges of the flanges 316 and enters the space between the facing 318 and the automatic and positive plates 319 and 320 respectively, removing any freed solid lubricant therefrom, and at the same time abstracting the heat that has been generated through slipping drive operations. The air, however, in making this sharp reverse turn, centrifugally separates the particles of oil, or solid lubricant (graphite) dust that may be recirculating in the clutch housing, and clean air is accordingly introduced between the plate surfaces.

In vehicles provided with automatic clutches of the character that have been previously described, and wherein the intake air for the clutch housing is drawn from the vehicle engine crankcase, it is entirely feasible to use woven fabric linings for facing the clutch member providing such woven facings can be kept saturated with oil. To this end we have disclosed in Figure 14 a clutch plate assembly that accomplishes operation of this character. Referring to this figure, driven clutch member 321 is provided with woven facings 322 which are secured thereto in any suitable manner and cooperate with automatic and positive plates 323 and 324 respectively. The inner periphery of automatic plates 323 and positive plates 324 are beveled as at 325, for the purpose of deflecting or pocketing the outwardly flowing air stream between the surfaces of the clutch facing and the automatic and positive plates for the purpose of withdrawing heat therefrom and at the same time supplying the woven material with lubricant in the form of oil vapor or liquid.

As has been previously explained, the clutch housings of the automatic clutches that have been disclosed herein may be provided with outlets having means associated therewith for controlling the flow of air from the clutch housing and consequently the temperature of the clutch mechanism. In Figures 15, 16 and 17, we have shown means for controlling the exhaust of air from the clutch housing, and they may be used in connection with any of the automatic clutches previously described.

In Figure 15 clutch housing 328 is apertured at 329 and receives the flanged sleeve 330 which is preferably cylindrical. Sleeve 330 constitutes the outlet air conduit and is provided with a valve 331 which is journaled on a pin 332, therein. Connected with valve 331 is a crank member 333 which is pivoted to an operating rod 334. Operating rod 334 may be suitably connected in any well known manner to a Bowden wire control assembly of the type shown in connection with Figure 1 of the drawings, or a foot pedal or the like. It is seen that by operation of valve 331, the temperature of the clutch mechanism, and accordingly the clutch characteristics, may be varied at will.

In Figure 16 we have disclosed a thermostatic valve for the clutch housing outlet for automatically maintaining the air at a predetermined temperature. Referring to Figure 16, the clutch housing 328 is provided with an aperture 329 which receives a flanged cup member 335 which is slotted at 336 to provide fluid communication from the clutch housing interior to the atmosphere. Seated in the bottom of cup 335 and secured thereto by means of a bolt 337 or the like is an expansible metallic bellows 338, which is closed at both ends thereof and is filled with a suitable vapor pressure exerting fluid. Secured to the top of the bellows 338 is a valve stem 339 which carries at its upper end valve member 341. Valve stem 339 is suitably guided for vertical movement within the cup by means of an apertured disc 342.

It is seen that this structure provides automatic temperature control of the clutch mechanism, and since the thermostatic element is disposed between the valve and the clutch housing, it is only responsive to temperatures thereof and is not influenced at all by temperatures that may exist externally of the clutch housing, thus giving even temperature control. If desired, the valve stem may be provided with means for adjusting the clearance between the valve and its seat so that any desired temperature may be maintained in the clutch housing.

Referring to Figure 17, clutch housing 328 is provided with a similar flanged sleeve 330. Pivoted on a pin 344 in sleeve 330 is a valve member 345. Valve 345 is adapted to close the opening end of sleeve 330 and is connected at 346 with a bi-metallic thermal-responsive element 347, which is secured at the other end thereof to a suitable pin 348 in sleeve 330. When the temperature in the clutch housing raises to a predetermined degree, element 347 will respond and accordingly open the valve, to maintain the temperature at the proper degree, and since it is disposed within the sleeve, it will not be affected by temperatures existing externally of the clutch housing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A clutch mechanism comprising a rotatable supporting structure; driving and driven clutch plates carried and housed by said structure; clutch facings including a large percentage of solid lubricant on at least one of said plates; centrifugally operated mechanism to force said plates together when said supporting structure attains a predetermined speed; at least one ventilating opening in the periphery of said structure adjacent the peripheries of said plates; and means, providing a plurality of fan blades disposed in said supporting structure for forcing a current of ventilating and cooling air outward between and around said plates and out through said ventilating opening to remove any solid lubricant from the mechanism which may be freed from said facings and to cool the mechanism in operation.

2. A clutch mechanism comprising a rotatable supporting structure, driving and driven clutch plates carried and housed by said structure; including clutch facings embodying large percentages of solid lubricant; centrifugally operated mechanism for forcing said plates together when said supporting structure attains a predetermined speed at least one ventilating opening in the periphery of said structure adjacent the peripheries of said plates; means for forcing a current of ventilating and cooling air outward between and around said plates and out through said ventilating opening; a housing surrounding said structure; an air inlet in said housing through which said air current is drawn; an air outlet in said housing through which the air passes outward from said ventilating opening, and means for controlling the quantity of air passed through said housing.

3. A clutch mechanism comprising a rotatable supporting structure, driving and driven clutch plates operably associated with said structure; means for controlling the driving engagement of said plates; means for forcing a current of ventilating and cooling air outward between and around said plates; a housing surrounding said structure; an air inlet in said housing through which said air current is drawn; an air outlet in said housing through which the heated air passes outward from the clutch mechanism; and means for controlling the rate of flow of air through said outlet opening to thereby control the temperature attained by the clutch mechanism.

4. The combination as set forth in claim 3 in which said last mentioned means is thermostatically controlled.

5. In a clutch, a housing having inlet and outlet openings formed therein; a clutch mechanism disposed within said housing and having a casing providing inlet and outlet ventilating air ports; means associated with said clutch mechanism for causing ventilating air to enter said inlet port, traverse said clutch mechanism and be exhausted from said outlet port, and means associated with said housing for preventing the ventilating air from flowing directly from said exhaust port to said inlet port.

6. In a clutch mechanism, a rotatable supporting member comprising a casing; driving and driven clutch plates disposed within said casing and mounted for engagement and disengagement, at least one of said plates having a friction facing thereon embodying large percentages of solid lubricant which is adapted to be freed therefrom during operation; fan blade means supported within said casing and rotatable synchronously with certain of said clutch plates for supplying a current of cooling and lubricant removing air to said plates when the clutch is in operation; and means for insuring removal of the lubricant carried by said ventilating air from said mechanism, comprising at least one exhaust passage provided in said casing radially opposite the engaging surfaces of at least two of said plates.

7. In a ventilated clutch, a casing mounted for rotation and having a centrally located aperture formed therein, driving and driven members disposed in said casing and mounted for engagement and disengagement; throwout levers associated with said members for controlling their operation, and means provided on said throwout levers for causing air to enter the aperture of said casing when the latter is rotated, for the purpose of cooling said members.

8. In a clutch, a housing having air inlet and outlet ports formed therein; a clutch casing rotatably supported within said housing and having air inlet and outlet ports provided therein, means for causing air to enter said housing and casing inlet ports and be exhausted from said housing and casing outlet ports when said casing is rotated; and means for preventing air from passing from said casing outlet port to said casing inlet port, comprising a baffle element provided on the interior of said housing and extending inwardly toward the axis of the mechanism and terminating closely adjacent to the outer surface of said clutch casing to thereby prevent the temperature of said air from being progressively raised by successive passages through said casing.

9. In a clutch, a driving plate; a driven plate; said driving and driven plates being mounted for relative axial movement; friction material secured to one of said plates and adapted to frictionally cooperate with the other of said plates; said friction material including substantial quantities of solid lubricant which is adapted to be freed therefrom during frictional slipping operation thereof: means for forcing said plates toward each other with said frictional material disposed and gripped therebetween; said frictional material being secured to said one plate in such manner as to allow air currents to flow over the surface of said other plate when it is engaged therewith and said plates are rotating at different speeds to thereby cool said plates and also allow said air currents to remove any solid lubricant that may be freed from said material.

10. The device set forth in claim 9, wherein said frictional material is secured to said driven member.

11. The device described in claim 9, wherein said frictional members are segmental in form, whereby they define substantially radially extending grooves for centrifugally inducing cooling, lubricant-removing air currents to traverse the face of said disc.

12. In a clutch, in sub-combination, a clutch driven disc, having frictional elements secured thereto, at least one driving clutch plate mounted for frictional cooperation with said driven disc, means for causing air currents to flow outwardly over said disc when it is rotated; and means for causing said air currents to flow over the frictional elements secured to said disc.

13. The device described in claim 12, wherein said last-named means comprises air-directing means carried by said driving clutch plate.

14. In a clutch mechanism a pair of driving members mounted for rotation about a common axis and adapted to undergo relative axial movement toward and away from each other, a driven disc disposed between said members and adapted to be frictionally gripped therebetween, and means provided on said driven disc for causing air to flow axially of the mechanism for bringing ventilating air into contact with the frictional portions of said members and said disc.

15. The mechanism described in claim 14, wherein said means comprises fan blades integrally formed with said driven disc.

16. The mechanism described in claim 14, wherein said driven disc is constructed of pressed metal and said means comprises fan blades which are struck out of the body thereof.

17. The mechanism described in claim 14, wherein said means also provides for transmission of air from one side of said driven disc to the other side thereof.

18. The device described in claim 9, wherein said one plate is provided on both sides thereof with segmental, circularly spaced, flat frictional members, providing outwardly extending air passages.

WADE D. MORTON.
WILLIAM E. HAUPT.